United States Patent

Ganz

[15] 3,680,678
[45] Aug. 1, 1972

[54] METHOD AND APPARATUS FOR GROUPING CONTAINERS ON A CONVEYOR

[72] Inventor: Robert H. Ganz, 8 Ridge Crest Rd., Saddle River, N.J. 07458

[22] Filed: July 30, 1971

[21] Appl. No.: 167,564

Related U.S. Application Data

[62] Division of Ser. No. 47,996, June 22, 1970.

[52] U.S. Cl. ..................................................198/34
[51] Int. Cl. ...........................................B65g 47/26
[58] Field of Search ..............198/30, 34; 53/48, 159

[56] References Cited

UNITED STATES PATENTS 2,756,553  7/1956  Ferguson.......................53/159

*Primary Examiner*—Edward A. Sroka
*Attorney*—Nichol M. Sandoe, Roy C. Hopgood, John M. Calimafde, Michael Ebert, Paul H. Bloustein, Eugene J. Kalil, Arthur M. Lieberman and Charles W. Neill

[57] ABSTRACT

The invention contemplates method and apparatus for the rapid and efficient formation of clusters of articles, such as beverage containers, as a preliminary to wrapping, as with shrinkable plastic film or sheet. The containers are received at one end of a production line in random succession, and are converted into groups or clusters appropriate for packaging, with the maximum dimension of the cluster transverse to the direction of conveyor movement. The clusters are then, in the course of their continuous movement along the conveyor, enveloped with sheet material.

24 Claims, 5 Drawing Figures

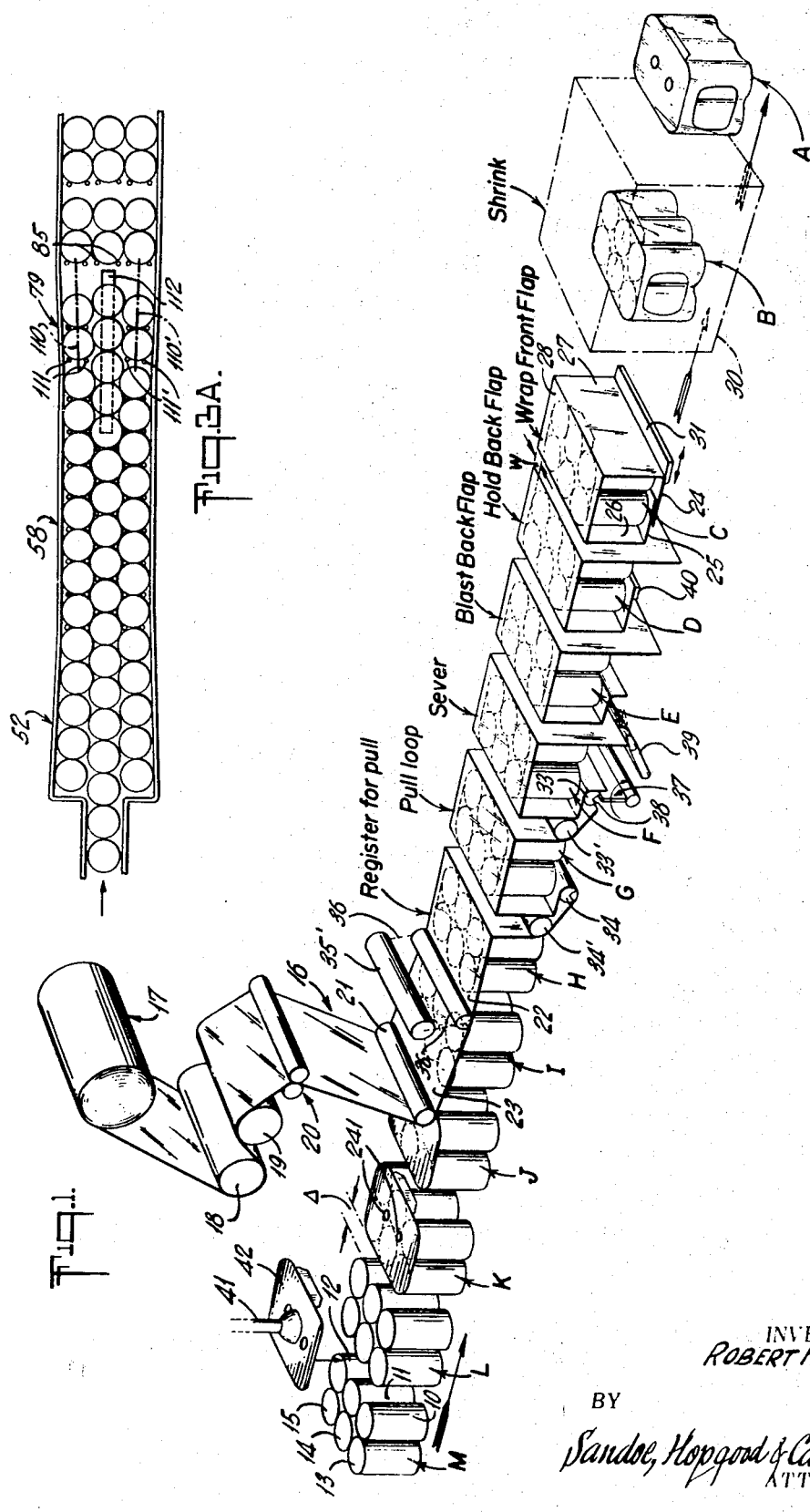

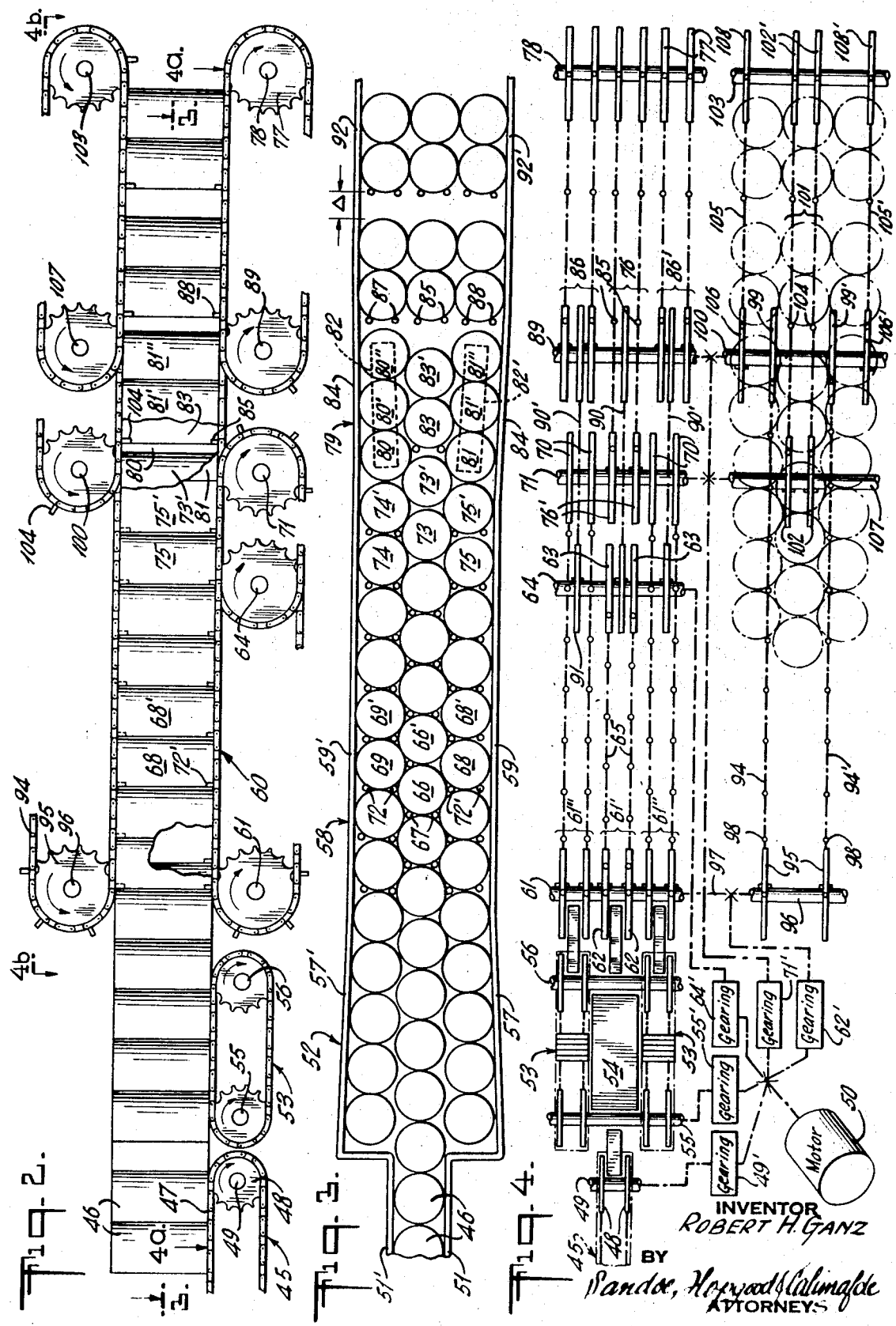

METHOD AND APPARATUS FOR GROUPING CONTAINERS ON A CONVEYOR

This application is a division of my copending application, Ser. No. 47,996, filed June 22, 1970, entitled "Packaging Machine and Method".

This invention relates to automatic packaging and in particular to a machine and method for continuously forming successive clusters of articles, in preparation for wrapping, as with flexible sheet material, all as the articles progress along a conveyor stream.

In the use of heat-shrinkage plastic sheet material to package articles or clusters of articles various machines and techniques have been proposed. These include use of cut-off lengths of the sheet material in tubular form and the use of sheet material in strip form. The tubular material presents an insertion problem and does not lend itself to high-speed, continuously flowing article movement along the conveyor system. The prior techniques of sheet-material use have involved plural sheets for each wrapping, and/or sheeting introduced orthogonally to the direction of conveyor transport. One of the most common cluster configurations for which such wrapping is needed is the familiar "2×3" six-pack as used for the marketing of cylindrical cans or for other containers having cylindrical bodies, and the grouping or clustering of containers for such packaging has presented further difficulties.

It is, accordingly, an object of the invention to provide an improved machine and method to avoid or substantially reduce the number and significance of the noted past difficulties.

Another object is to provide a machine and method meeting the above object with inherent, substantially enhanced production-rate capability, as compared to known machines and methods.

A further object is to provide a machine and method meeting the above objects without impairing the smooth continuous flow of closely spaced articles or clusters of articles, from the beginning to the completion of packaging.

A specific object is to provide an automatic continuously flowing article-grouping mechanism, delivering articles aligned in single or double groups of three, for group packaging, as in "1×3" three-packs or "2×3" six-packs, said alignments being transverse to the path of continuous flow.

Another specific object is to provide cluster-forming mechanism particularly suited to use with packaging mechanism using continuously supplied flexible sheet material which is fed to the wrapping location in the direction of movement of container clusters to be wrapped.

A general object is to meet the above objects with smoothly continuously running mechanism which involves a minimum of different operations on the work (containers), which involves minimum change in motion of the work in the course of production-line movement, and which enables achievement of a superior packaged product at reduced cost.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

FIG. 1 is a simplified view in perspective showing elements and steps of the invention, in application to successive container clusters on a production line before, during, and after completion of packaging;

FIG. 2 is a simplified fragmentary view in elevation of conveyor parts in the cluster-forming portion of the equipment;

FIG. 3 is a simplified plan view, taken substantially from the aspect 3—3 of FIG. 2;

FIG. 3A is a view similar to FIG. 3 to illustrate a modification; and

FIG. 4 is a diagrammatic view, involving schematically interconnected lower and upper drives for mechanism shown in simplified plan taken respectively from the aspects 4a—4a and 4b—4b of FIG. 2.

Briefly stated, the invention contemplates method and apparatus for the rapid and efficient formation of clusters of articles, such as beverage containers, as a preliminary to wrapping, as with shrinkable plastic film or sheet. The containers are received at one end of a production line in random succession and are converted into groups or clusters appropriate for packaging, with the maximum dimension of the cluster transver to the direction of conveyor movement. The clusters are then, in the course of their continuous movement along the conveyor, enveloped with sheet material, which is paid out in the longitudinal direction of conveyor movement. In final passage of the conveyor through an oven, the sheet material is adhered to bind the envelopment and is shrunk into tensed limited conformance with the cluster profile.

The invention is disclosed in the context of producing shrink-packing of so-called "2×3" six-packs, wherein six line cylindrical containers or cans are arrayed as two adjacent rows of three, the three being abreast, i.e., aligned side-by-side, transverse to the direction of conveyor movement. The invention is concerned with novel methods and means to achieve such groups or clusters, apart from the methods and means of wrapping. This cluster-forming portion of the invention is discussed under a separate head, following a brief introductory description of the overall packaging process.

THE PACKAGING PROCESS, GENERALLY

FIG. 1 serves for an introduction to the packaging process, in general terms, and in the showing of FIG. 1 it will be understood that there has been great simplification, to permit best viewing of the packaging steps.

The longitudinal arrows at both ends of FIG. 1 connote left-to-right movement of a succession of clusters A, B, C . . . M along conveying means (not shown), in the course of which movement packaging is accomplished, to the condition suggested by the overall appearance of the package A, at the terminal end of the process. Each cluster, such as the cluster M, comprises two adjacent rows of like cylindrical containers 10–11–12–13–14–15, aligned three-abreast and transverse to the direction of conveyor movement. The formation of such clusters is later described in connection with FIGS. 2 to 4, which mechanism delivers the clusters in closely nested adjacency and with uniform spacing $\Delta$ between adjacent clusters. This spacing $\Delta$, and the speed of cluster movement along the conveyor, are both maintained throughout the sheet-wrapping phase.

Material 16 for sheet wrapping is supplied from a reel or magazine 17 which may be suitably suspended over the moving clusters, on a rotary axis transverse to conveyor movement. Tensioning, positioning, and other pay-out control roller elements 18–19–20–21 bring the sheet material down into proximity with the adjacent end plane of the clusters, to enable an elongated pay-out of the same, over one or more clusters, as suggested by the stretches 22–23 which are seen to overstand clusters H and I. Preferably, the material 16 is a shrinkable plastic, and I have achieved satisfactory results using commercially available polyethylene film, of 1 or 2-mil gauge, and longitudinally extruded, so that the predominant shrink axis is longitudinal, in the sense of pay-out direction and in the sense of cluster movement.

In the present illustrative case, the wrapping comprises the peripheral enclosure of each cluster with a single cut-off piece of the sheet 16, as best illustrated for the cluster C, where the single sheet is formed into overlapping bottom flaps or ends 24–25, contiguous to side panels 26–27 and to a smooth, continuous top panel 28. The width of the sheet 16 exceeds the overall width of the clusters, to the extent W at both ends, the pay-out stretch 22–23 having been symmetrically positioned astride the path of cluster movement. It will be understood that at the fully enveloped state (cluster C), the weight of containers (against supporting elements of the conveyor, not shown) is sufficient to hold the flaps 24–25 in overlapped register as the wrapped cluster passes to an oven 30; in the form shown, the speed of feed elements to the oven 30 exceeds that of feed elements which are operative in the wrapping phase, and a reciprocating shuttle plate 31 is suggestive of means aiding the transition of wrapped clusters from one set of feed elements to the next. Once in the oven, the overlapped ends 24–25 become fused and the projecting ends of the sheet material reduce to conform to the cluster contour, including the end contour, all as more fully set forth in my copending application, Ser. No. 29,127, filed Apr. 16, 1970. The more rapid feed of wrapped clusters in the over 30 enables their expanded spacing, as shown, and the finished article quickly exits for cooling to room temperature, permanently tensed, bonded, and shrunk, as for the package A.

Efficient single-sheet wrapping of the character indicated is accomplished by the coordinated vertical and horizontal components of displacement of loop-forming means such as a transversely extending bar, which may be one of a series 33–34–35 carried by a linked endless system, not shown in FIG. 1. Each bar 33–34–35 may be articulated in its connection to the endless system, and a cluster-spacing bar member 33'–34'–35' may be provided at each such pivotal connection, the rigid spacing and end connection of corresponding bar members being suggested by dashed lines 36, for the case of bar members 35–35'.

In the cycle of synchronized coaction between pairs of bar members and the successive clusters, the loop-forming bar 35 is initially brought into tensing contact with the span 22–23 of sheet material, in vertical registration with the space $\Delta$ between adjacent clusters H–I, thus stretching the span 22 over the top of the leading cluster H as it descends into the space $\Delta$. As bar 35 descends, it pulls new sheet material as a tensed loop through and beyond the vertical limit of the space $\Delta$ and, in the course of such descent it is followed by the corresponding spacer bar (35'), of diameter (substantially $\Delta$) to assure maintenance of the space.

Once the loop-forming bar has passed through the space $\Delta$, it is caused to accelerate forward to stretch the sheet in the direction of applying bottom-flap material under the bottoms of the second or trailing row of containers (13–14–15) of the forward cluster. In FIG. 1, this situation is illustrated by the pair of bars 34–34', operative upon the adjacent clusters G–H, and at a time when both bars 34–34' have matched the speed and direction of cluster transport; the bar 34 has pulled out the loop of sheet to the maximum extent and is supporting containers 13–14–15 with bottom-flap material pinched by the weight of these containers. The spacer bar 34' is at its lower-most position, acting to retain the spacing $\Delta$ at contact with the lower parts of adjacent clusters G–H; at the same time, spacer bar 34' assures that the two halves of the loop will be kept tensed against and over adjacent cluster side areas, to define what will become the back panel 26 of the forward cluster G and the front panel 27 of the next succeeding cluster H.

Having defined, extended and stretched the sheet loop, while necessarily performing part of the wrap on each of two adjacent clusters, the loop is severed at substantially its midpoint. This moment is illustrated in FIG. 1 for the case of bars 33–33' coacting with adjacent clusters F–G. Cut-off is schematically indicated by a rotary element 37, extending transversely of and driven in synchronism with conveyor movement, to cut across the sheet where it spans a groove 38. Such a groove 38 is formed in each loop-forming bar and is oriented downwardly open when the loop-forming bar is in its most-forward position, as for bar 33 in FIG. 1.

Having severed the sheet, the forward cluster F is now free of paid-out material, and means symbolized by a directional air-blast device 39 is operative upon the severed rear flap 25 to lay the same flap over the bottom end of the cluster to the extent that it will so reach. In FIG. 1, the air blast device 39 is shown at the instant of commencing action upon the severed flap beneath cluster E, and once the flap is laid flat, a suitable flap-retaining member holds the position. In FIG. 1, the flap-retaining member 40 is shown performing this function on cluster D; member 40 will be understood to be part of the conveyor system, so that flap-retention continues. The remaining enveloping operation involves backward folding of the bottom flap 24 into overlap with the flat 25 and may be accomplished by stationary means (not shown) encountered upon forward conveyor progress of the clusters, as for example between the stages represented by clusters D and C in FIG. 1. In the course of developing this overlap, the retaining member 40 is withdrawn by suitable means (not shown).

The described continuous-wrapping procedure will be understood to take place without any interruption or change of pace in the movement of clusters through the zone represented by clusters J to C in FIG. 1. At the same time, the pay-out of sheet material from the supply 17 may involve a smoothed and continuous rotation, as by synchronizing displacement of a tension roll 19 in accordance with the transient needs of the loop pull-out bar for each successive cluster.

FIG. 1 additionally illustrates an optional packaging feature wherein, if desired, the wrap may incorporate additional material such as a promotional display panel, marketing premium, or the like beneath the top panel 28 of the shrink wrap. For this purpose, suitable handling means 41 is reciprocated in synchronism with conveyor advance of successive clusters and is operative to place a paperboard panel 42 (shown with stiffening side flanges 43) in register with the top ends of the containers; a new such top panel 42 may be so positioned and applied to each successive cluster. In FIG. 1, such a panel has been completely applied to the clusters K–J and all preceding clusters, but the panel 42 is in the process of being applied to the cluster L.

CONTAINER GROUPING

As indicated generally above, I provide novel methods and means accepting a steady stream of input containers and converting this stream into the indicated succession of spaced clusters exemplified by the adjacent clusters M–L in FIG. 1 and with the regular spacing $\Delta$. The mechanism for accomplishing this is schematically indicated in FIGS. 2, 3 and 4. For the situation in which the steady stream of incoming containers is received via a single-file conveyor, best seen on the left end of FIG. 3, this conveyor comprises an endless loop 45 of linked elements establishing a plane of support for the containers 46 upon its upper span 47. Spaced sprockets 48 on a shaft 49 drive the conveyor 45 at a rate adequate for the capacity of the machine. Such drive is schematically indicated by the motor 50 with a suitable gear connection 49' to the shaft 49. Fixed side rails 51–51' pilot the container bodies to assure the described single-file movement.

The single-file supply of containers enters an enlarged region 52 of the conveyor system, wherein containers are allowed to find their own transverse positions, consistent with the container capacity of the region 52. Within this region, another section 53 of the conveyor system operates to support the containers and to urge them forwardly, i.e., in the direction to the right in the sense of FIGS. 2 to 4. As shown in FIG. 4, the conveyor system serving the region 52 comprises two like conveyors 53–53' which are laterally spaced on opposite sides of a smooth table or shoe plate 54 and which are driven alike from a common shaft 55 and suitable gearing 55' connected to the motor 50.

The enlarged region 52 is characterized by side walls or rails 57–57' which converge into a constricted region 58, the walls 57–57' being shown continuously connected to or formed with the rails 59–59' of region 58. In the region 58, the containers assume a honeycomb or diamond-shaped nested relation; preferably, the space between rails 59–59', which defines the constricted region 58, is greater than twice the effective diameter of the containers but less than three times that diameter. Of course, the density with which containers may be packed into the constricted zone 58 will depend upon the particular spacing of side rails 59–59' within the stated range, and it is my preference that this density be as great as may be gracefully accommodated by the mechanism, namely, by spacing rails 59–59' generally in the more restricted range of 2.5 to 2.8 times the effective container-body diameter. More specifically, I prefer that this range be between 2.7 and 2.75 for the case of conventional 12-oz. or 16-oz. cylindrical containers as shown.

Throughout the constricted zone 58, container-supporting conveyor means 60 is continuously operative but is positive and direct in its positioning engagement with individual containers, thus assuring control of the development of the desired honeycomb pattern in the region 58. Drive to the conveyor 60 is provided by a shaft 61 to which plural drive sprockets are keyed, and shaft 61 may be driven by the motor 50 through suitable gearing 62'. In the form shown, three separate conveyors operate in zone 58; all of them are driven from the common shaft 61. The first of these conveyors is identified 61' in FIG. 4 and comprises two spaced sprockets 62 with matching idler sprockets 63 free to rotate on a forward shaft 64. Linked endless chains 65 are spaces less than container diameter and are carried by the sprocket systems 62–63, being positioned symmetrically astride the center of the alignment of central containers 66–66' in the constricted zone 58. Spaced locating lugs form part of each of these chain systems 65 at matching locations along the respective chains. In FIG. 4, these locations are symbolized by small circles in the series of dashed lines, suggestive of the alignment of chains 65. These lugs are identified at 67 in FIG. 3 immediately behind each of the containers 66 in the central alignment, and the lugs 67 will be seen to bear symmetrically upon laterally spaced regions of the trailing arc of the surface of each central container body.

The conveyor system in the constricted zone 58 comprises two smaller pairs of chain systems 61" serving the respective outboard alignments of containers such as containers 68–68' and 69–69' in FIG. 3. The chain systems 61" are in all respects the same as described for the systems 61' except for their outboard locations and except for the fact that they extend longitudinally further than the systems 61', being run over idler sprockets 70 carried by a further shaft 71. Drive to the systems 61" may be from sprockets (not identified) but keyed to the same shaft 61 as that described for the drive sprockets 62, and the chains of systems 61" may carry spaced pairs of lugs, such as lugs 72 (FIG. 3) for the outer-container alignment 69–69' etc., and similar lugs 72' for the outer alignment of outer containers 68–68', etc. The transverse alignment of lugs 72–72' for corresponding containers of the outer-container alignments 68–68', 69–69' are interlaced with or longitudinally offset from the lugs 67 for advancing the central alignment of containers 66–66' and the degree of offset is such as to assure positive advancing thrust for each container in the region 58, i.e., between shafts 61 and 64. Beyond the location of shaft 64, the center drive 61' terminates but central containers 73–73' are nevertheless continuously and positively advanced by reason of symmetrical edge contact (at their rear sides) with adjacent containers 74–74' and 75–75' of the respective outer alignments.

The constricted region 58 ends essentially at the location of shaft 71, at which point a new pair of centrally aligned endless conveyor chains 76 assumes advancing control. The chains 76 are driven by spaced sprockets 76' keyed to the shaft 71 which in turn is driven by motor 50 through suitable gearing 71'. The other end of the chain system 76 runs over idler sprockets 77 on a shaft 78, which may represent the location of discharge of conveyed clusters of containers to the package-wrapping zone of the machine. The gearing 71' which accounts for the drive of the chain system 76 preferably operates at a greater speed of advance than that which governs conveyor advance through the constricted zone 58; this increased speed enables development of the space Δ between clusters, as will be explained.

As the space Δ is being developed, the outer containers are retarded with respect to the centrally aligned containers, to achieve the three-abreast transverse alignments needed for the ultimate cluster formation. This process takes place in a divergent zone 79, wherein positive drive to the outer aligned containers is dropped and wherein the outer containers 80–80'–80" and 81–81'–81" may merely slide or drag over supporting shoes or platens 82–82' as the forward thrust from centrally aligned containers 83–83' urges them outwardly to the limiting rails 84 of the divergent zone 79.

In the chain system 76, container-engaging lugs 85 are longitudinally spaced to a greater extent than in the chain systems 61'–61". This greater longitudinal extent amounts to substantially the spacing Δ between cluster rows, plus the number of container diameters which corresponds with the number of rows to be wrapped in a cluster. In the form shown, double rows (2×3 six-packs) are thus wrapped, and the longitudinal spacing between pairs of lugs 85 on the chain system 76 is substantially twice the effective container diameter, plus the space Δ. In the course of movement through the diverging zone 79, the sliding outer containers 80'–80" and 81'–81" are actually accelerated by the faster drive via their central counterparts 83–83' but they drag and thus become effectively retarded with respect to the positive advance of the centrally aligned containers 83–84', to the point where there is transverse alignment of all three containers, e.g., 80'–83–81' and 80"–83'–81" of the two rows constituting the cluster grouping. This event occurs when the divergence between side rails 84 substantially matches three times the effective container diameter. From this point onward, positive feeding advance may be imparted to the thus-aligned outer container pairs in order to maintain cluster grouping and registration. In FIG. 3, additional like outboard-container-advancing chain systems 86–86' (with container-advancing lugs 87–88) have matched alignments beyond the location of their drive shaft 89, and because of the synchronized relation between drives to chain systems 76–86–86', the shafts 71–89 are both shown connected to motor 50 via the same gearing 71'.

In the region of transition between the slower feed of conveyor 65 and the faster feed of conveyor 76, the centrally aligned containers may be supported by a fixed plate or shoe (not shown) or by a short central supplementary chain system 90. Chain system 90 spans sprockets on shafts 64–89 and is not equipped with container-engaging lugs; it is driven from shaft 64 via gearing 64', which may match the gearing 62' so as to impart no speed changes to the centrally aligned containers.

In like manner, and if desired, the drag shoes or plates 82–82' may be considered optional and be replaced by supplementary chain systems 90', spanning sprockets on the shafts 64–89, and also driven from the shaft 64. As with chain system 90, the systems 90' have no container-engaging lugs, and are located between the conveyor-chain pairs which serve their respective alignments of containers.

It will be understood that the shaft 78 serves idler sprockets for all the chain systems 75–86–86' in the region in which fully grouped "2×3" clusters are being conveyed at spacings Δ. In this region, the spaced side rails are unnecessary in that the lugs 85–87–88 presumably have full control over the cluster arrays. However, I show and prefer the continuous extension of the side-rail system as shown at 92–92', to provide positive assurance of laterally retained cluster groupings. The spacing between rails 92–92' is necessarily substantially three times the effective container diameter, plus a small amount for clearance purposes.

The described mechanism is basically adequate to assure the desired result of automatically grouping clusters three containers wide in each of two rows, as long as an adequate supply of containers 46 is forthcoming at the inlet to the converging zone 52. The longitudinal extent of the converging zone 52 is adequate to assure that containers of the central alignment will not retain purely dead-center alignment but rather will distribute successive containers to the right and left of the central alignment, to the extent that an adequate and full supply of containers is always on hand in the convergent zone 52. The density of compaction of the nested containers on entry into the constricted zone 58 will depend upon the particular selected spacing between side rails 59–59', and of course the longitudinal spacing between corresponding pairs of drive lugs 67 on the central chain system 61' (and also between corresponding pairs of lugs 72–72' on the outer chain systems 61") will be selected appropriate to the constriction afforded by the spacing between rails 59–59'. For the densely compacted dimensioning display in FIG. 3, the center-container-advancing lugs 67 are interlaced substantially one-half the distance between spacings of corresponding lugs 72–72' in the outer conveyor systems 61".

Although the described system will adequately segregate and position clusters as indicated, I prefer to maintain even further assurance of cluster formation and positioning control by providing overhead chain systems, synchronized with their counterparts which lie beneath the plane of support of the passing containers. The overhead chain systems are schematically indicated in the bottom half of FIG. 4 and are shown to have common drive connections to their already described counterparts beneath the containers. For example, in the constricted zone 58 two spaced conveyor chains 94–94' are driven by sprockets 95 keyed to the overhead driveshaft 96, shown having a direct interconnection 97 to the lower driveshaft 61; the chain systems 94–94' are completed by passage over idler sprockets 99–99' at an overhead shaft 100 directly above the shaft 89. Lugs 98–98' on the chain systems 94–94' have spacings corresponding to those between successive lugs 72 and successive lugs 72', so that the lugs 98–98' will engage parts of the outer aligned containers in the constricted zone 58. It will be noted that even though chain systems 94–94' overlap the diverging zone 79, where outer containers are laterally spread as central containers accelerate, this presents no problem since the movement of the outer containers is in the direction away from engagement with lugs 98–98' in this zone. Of course, further overhead lug-bearing conveyor chains can be added to provide even further container-positioning assurance, but I find this unnecessary.

Also overlapping the diverging zone 79 is a central pair of overhead chain-drive systems 101, driven by sprockets keyed to a shaft 107 having a synchronized connection to the shaft 71, and the down-stream end of these chain systems 101 rides idler sprockets 102 on an overhead shaft 103, above the shaft 78. Lugs 104 on the chain systems 101 are spaced in accordance with lugs 85 on the corresponding lower chain systems 75. To complete the description of the overhead system, final outboard chain systems 105–105' register with the outer of systems 86–86' and carry lugs 106–106' in transversely aligned relation both with the lugs 104 and the lugs 85–87–88 of the system beneath the containers. Drive to the chain systems 105–105' is by a sprocket (not identified) on the overhead driveshaft 107, directly synchronized with the corresponding driveshaft 89 beneath the plane of container support, and these chain systems utilize idler sprockets 108–108' on the final overhead shaft 103.

In the clustering systems thus far described, aligned groupings of containers three abreast are achieved by allowing the outer aligned containers to effectively retard, drag or slip back with respect to the accelerating faster advance of their adjacent central containers, and this occurs during the passage or flow of containers through the diverging zone 79. FIG. 3A illustrates an alternative wherein the desired cluster result is achieved by positively accelerating the advance of corresponding containers in the outer alignments while permitting containers in the central alignment to effectively retard or drop back. Thus, in FIG. 3A, the heavy phantom alignments 110–110' will be understood schematically to indicate slightly divergent like and synchronized container-advancing chain systems throughout the diverging zone, and each one of these chain systems includes suitable spaced pairs of container-advancing lugs (as at 111–111') to assure positive advance at the correct speed and in the correct direction for these outer alignments of containers in the diverging zone 79. In this zone, the centrally aligned containers may optionally have a slip drive in the manner discussed for the slip drive mechanisms 90–90' of FIG. 4, or a supporting shoe plate 112 may carry the central containers as they retard with respect to advance of the outer conveyors 110–110'. At discharge from the diverging zone 79, the transverse rows of clustered containers are correctly aligned, and lugs 85 of the central chain systems 75 may pick up and govern ensuing displacement of the central containers in the successive clusters, all containers then being driven at the same accelerated speed appropriate to definition of the desired space Δ between clusters, as previously described.

It will be seen that I have described cluster-forming mechanism and methods achieving all the stated objects and functioning with great efficiency in a continuously flowing production-line delivery of clusters, for packaging in the same production line. There is not the slightest interruption or slow-down or constricting limitation on the overall flow, even though transient local constriction is an element of achieving a cluster-grouping result. The method and apparatus offer significant economies and vastly increased reliability over prior techniques which rely on indexing devices to achieve container (article) separation and grouping.

While the invention has been described in detail for the preferred methods and structures shown, it will be understood that modifications may be made without departing from the scope of the invention.

What is claimed is:

1. The method of continuously automatically grouping into like clusters and along a production conveyor a supply of like upstanding individual containers having cylindrical body parts, said method comprising confining the lateral limits within which containers pass along the conveyor, said limits successively defining a converged zone contiguous to a diverging zone, said converged zone being of effective lateral extent that is greater than twice but less than three times the effective container body diameter, whereby at said converged zone groups of three laterally adjacent containers tend naturally to be confined by each other and by the limits of the converged zone into a pattern of a center container symmetrically contacting each of two outer containers in longitudinally offset relation to the outer containers, said groups being longitudinally nested into contact relation with each other, said diverging zone expanding in the direction of container movement to a lateral extent which is at least three times the effective container body diameter, accelerating the longitudinal feed of the center containers with respect to movement of the outer containers as said containers progress through said expanding zone, thereby causing the outer containers to laterally displace as the center containers overtake and become transversely aligned with the outer containers, and thereafter feeding in unison successive groups of transversely aligned containers.

2. The method of claim 1, in which said last feeding step is at a rate faster than that of container movement at the achievement of transverse alignment, whereby each successively fed group of transversely aligned containers is caused to establish a longitudinally spaced relation to the next succeeding group.

3. The method of claim 2, in which said last feeding step is operative on aligned groups at alternate alignments thereof, whereby each successively fed group comprises a two-by-three cluster of six containers which is caused to establish a longitudinally spaced relation to the next succeeding cluster.

4. The method of claim 1, in which said confining step includes, prior to container passage into said converged zone, the confinement of containers in a zone which converges from an enlarged end larger than that of said converged zone.

5. The method of claim 4, in which said enlarged end is in the order of three times the effective container body diameter.

6. The method of claim 5, wherein the supply of containers is admitted as a single stream of single containers into the enlarged end of said last-defined converging zone.

7. The method of claim 1, wherein said converged zone is of effective lateral extent substantially in the range between 2.5 and 2.8 times the effective container body diameter.

8. The method of claim 1, wherein said converged zone is of effective lateral extent substantially in the range between 2.70 and 2.75 times the effective container body diameter.

9. Container-clustering mechanism comprising an elongated conveyor with means for continuously supplying like containers therealong, said containers having cylindrical body parts and being seated on said conveyor with their cylindrical axes upright, side-rail means defining spaced lateral limits of said conveyor along a portion of the length thereof, said rail means being laterally spaced in a converged region of effective width between two and three times the effective container-body diameter, said rail means including a diverging region issuing from said converged region and expanding in the direction of container movement to a lateral extent which is at least three times the effective container body diameter, first feed means operative to feed containers through said converged region in a continuous regular pattern in which centrally aligned containers are longitudinally offset from and symmetrically contact adjacent outer containers in spaced longitudinal alignments of outer containers, second feed means operative throughout said diverging region to feed center containers at a rate so differing from the rate of feed of corresponding adjacent outer containers that, at that point in the diverging region where the lateral extent becomes substantially three times the effective container diameter, the center containers become substantially transversely aligned in a cluster with corresponding adjacent outer containers, and third feed means operative to feed successive clusters in unison.

10. Container-clustering mechanism according to claim 9, in which said second feed means is directly operative on the alignment of central containers to the exclusion of alignments of outer containers, whereby in the course of forward feeding of central containers in said diverging region each central container contacts two forwardly adjacent outer containers to drive the same with a longitudinal motion component and with a lateral motion component, consistent with the local degree of expansion of the diverging rail means.

11. Container-clustering mechanism according to claim 9, in which said second feed means is operative to advance the displacement of center containers with respect to adjacent outer containers in said diverging region, until corresponding containers achieve cluster alignment.

12. Container-clustering mechanism according to claim 9, in which said second feed means is operative to retard the displacement of center containers with respect to adjacent outer containers in said diverging zone, until corresponding containers achieve cluster alignment.

13. Container-clustering mechanism according to claim 9, in which said second feed means is directly operative on the alignments of outer containers to the exclusion of the center-container alignment, whereby in the course of forward feeding of outer containers in said diverging region each outer container contacts the forwardly adjacent central container and the adjacent limit of said rail means to drive the central container with a longitudinal motion component while also outwardly displacing itself to allow the central container to drop back into the cluster alignment.

14. Container-clustering mechanism comprising an elongated conveyor with means for continuously supplying like containers therealong, said containers having cylindrical body parts and being seated on said conveyor with their cylindrical axes upright, said conveyor including at a first region continuously driven endless feed-loop means including a span beneath the containers and including projecting container-locating elements establishing in said first region a container pattern wherein centrally aligned containers are longitudinally offset from adjacent transversely aligned outer containers, container-limiting divergent side rails on opposite sides of said conveyor and diverging from a narrow end at the downstream end of said span to a widened end of at least three times the effective container diameter, second continuously driven endless feed-loop means including a span beneath centrally aligned containers in the region of said divergent side rails and including projecting container-locating elements establishing in said divergent region a drive limited to central containers and at a speed faster than that of the feed-loop means in said first region, whereby center containers laterally spread and forwardly drive forwardly adjacent outer containers to the point of clustered transverse alignment, and third feed means operative to advance thus-clustered containers in unison.

15. Container-clustering mechanism according to claim 14, in which said conveyor includes drag-plate means for supporting outer containers in said diverging region.

16. Container-clustering mechanism according to claim 14, in which said conveyor includes at the upstream end of said first region a further region of container-limiting convergent side rails issuing into said first region at a narrow end having a lateral span greater than twice and less than three times the effective container diameter, and continuously driven container-engaging feed-loop means beneath containers in said further region.

17. Container-clustering mechanism according to claim 16, in which said last-defined feed-loop means is operative primarily on containers adjacent said converging rails.

18. Container-clustering mechanism according to claim 16, in which said further region has a wide upstream end having an effective width of substantially three times the effective container-body diameter between said converging rails, and means supplying a stream of containers to said wide upstream end.

19. Container-clustering mechanism according to claim 18, in which said last-defined means comprises a single-file container-supply feed to the generally central region of said wide upstream end.

20. Container-clustering mechanism according to claim 19, in which continuously driven endless feed-loop means supports containers in the single-file feed region in free-sliding relation with container bottoms, said last-mentioned feed-loop means being driven at a rate which without slip will supply more containers per unit time to said converging region than can be passed by said first feed-loop means through said first region, whereby said converging region is constantly maintained substantially fully loaded with containers.

21. Container-clustering mechanism according to claim 14, in which said conveyor further includes at said first region further continuously driven endless feed-loop means including a span above and adjacent containers in said first region and including projecting container-locating elements, said first and said further feed-loop means being synchronized and driven in opposite directions, and the container-locating elements thereof being positioned to retain upright orientation of corresponding containers by engaging upper and lower portions thereof.

22. Container-clustering mechanism according to claim 14, in which said conveyor further includes at said divergent region further continuously driven endless feed-loop means including a span above and adjacent centrally aligned containers in said divergent region and including projecting container-locating elements, said second and said further feed-loop means being synchronized and driven in opposite directions, and the container-locating elements thereof being positioned to retain upright orientation of corresponding central containers by engaging upper and lower portions thereof.

23. Container-clustering mechanism according to claim 14, in which said third feed means comprises synchronized upper and lower feed-loop means having spans respectively adjacent tops and bottoms of containers issuing from said divergent region, said third feed means further including container-locating elements positioned to retain upright orientation of corresponding containers by engaging upper and lower portions thereof.

24. Container-clustering mechanism according to claim 23, wherein said second feed-loop means and the feed-loop means of said third feed means are synchronized and driven at the same container-advancing speed.

* * * * *